United States Patent [19]

Apgar

[11] Patent Number: 4,778,328
[45] Date of Patent: Oct. 18, 1988

[54] TRAY LOADER APPARATUS

[75] Inventor: William J. Apgar, Inglewood, Australia

[73] Assignee: Apgar Industries Limited, West Perth, Australia

[21] Appl. No.: 937,614

[22] Filed: Dec. 3, 1986

[63] Continuation of PCT AU86/00112 filed Apr. 23, 1986, published as WO86/06333, Nov. 6, 1986

[30] Foreign Application Priority Data

Apr. 24, 1985 [AU] Australia ............................ PH0283
Dec. 24, 1985 [AU] Australia ............................ PH4029

[51] Int. Cl.$^4$ ................................................ B60P 1/02
[52] U.S. Cl. ........................................ 414/541; 414/921
[58] Field of Search ...................... 414/539–542, 414/544, 545, 549, 921, 495, 630, 631, 282, 283, 277–280, 659–661

[56] References Cited

U.S. PATENT DOCUMENTS

| | | | |
|---|---|---|---|
| 2,850,186 | 9/1958 | Zwight | 414/545 |
| 3,050,205 | 8/1962 | Coash et al. | 414/277 X |
| 3,154,025 | 10/1964 | Worthington | 414/541 X |
| 3,174,634 | 3/1965 | Peck | 414/541 |
| 3,357,582 | 12/1967 | Wittek | 414/660 X |
| 3,762,531 | 10/1973 | Lee | 414/280 X |
| 4,671,730 | 6/1987 | Gateau | 414/541 X |

FOREIGN PATENT DOCUMENTS

| | | | |
|---|---|---|---|
| 1087555 | 10/1980 | Canada | 414/921 |
| 26510 | 4/1981 | European Pat. Off. | 414/921 |
| 2246347 | 3/1973 | Fed. Rep. of Germany | 414/540 |
| 2617754 | 11/1977 | Fed. Rep. of Germany | 414/921 |
| 2502079 | 9/1982 | France | 414/921 |
| 59029 | 2/1980 | Japan | 414/921 |

Primary Examiner—Robert J. Spar
Assistant Examiner—David A. Bucci
Attorney, Agent, or Firm—Kerkam, Stowell, Kondracki & Clarke

[57] ABSTRACT

A tray loader includes a rail fixed to the load compartment of a vehicle. The rail has a rail part which can roll horizontally there along, which part in turn has a traveller horizontally rollable therealong. The traveller carries a post comprising telescoping parts. A single flexible device such as a chain, aided by the actuation of clutches between the rail part specifically between part 31 and the traveller and between the post and the rail, causes extension of the rail by lowering of the lower end of the post with its attached tray.

19 Claims, 11 Drawing Sheets

TRAY LOADER APPARATUS

CROSS-REFERENCE TO RELATED APPLICATION

This is a continuation of International Applicaton No. PCT/AU86/00112, filed Apr. 23, 1986, published as No. WO 86/06333 on Nov. 6, 1986, and claiming priority based on Australian Application No. PH 0283 filed Apr. 24, 1985 and No. PH 4029 filed Dec. 24, 1986.

DESCRIPTION

The present invention relates to a tray loader apparatus.

FIELD OF THE INVENTION

The tray loader apparatus of the present invention is particularly intended for installation in a vehicle to enable loads to be loaded and unloaded therefrom but it is to be understood that the apparatus of the present invention is of general applicability.

SUMMARY OF THE INVENTION

In accordance with one aspect cf the present invention there is provided a tray loader apparatus comprising rail means having a first rail arranged to be stationarily fixed to a supporting structure, and a second rail slidably associated with the first rail and arranged to move relative to the first rail in a horizontal direction, a post associated with the second rail and having a lower end, a load supporting tray mounted at the lower end of the post and arranged to be horizontally disposed, in use, and the lower end of the post being arranged to be raised and lowered together with the tray relative to the rail means, and the apparatus comprising means for causing the second rail to move relative to the first rail so as to extend the rail means in a horizontal direction and then causing the lower end of the post and the tray to be lowered, and for causing the lower end of the post and the tray to be raised from a lowered position to its initial position and then for the second rail to move relative to the first rail so as to retract the rail means.

BRIEF DESCRIPTION OF THE DRAWINGS

The present invention will now be described, by way of example, with reference to the accompanying drawings, in which.

DESCRIPTION OF THE INVENTION

Figure 1:
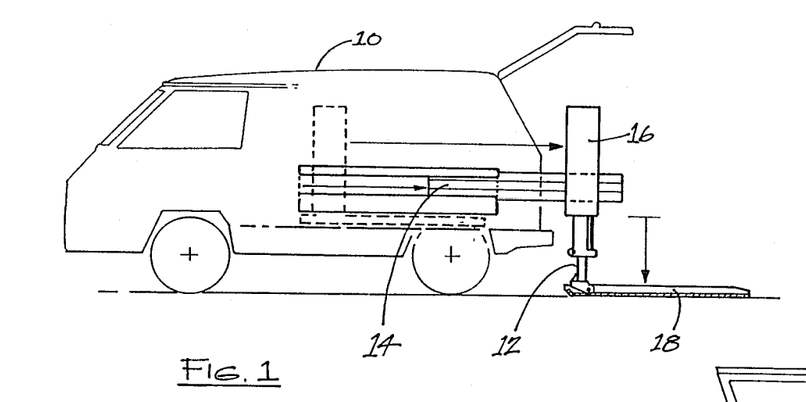
FIG. 1 is a side elevation of a vehicle having mounted therein a tray loader apparatus in accordance with the present invention.
Figure 2:
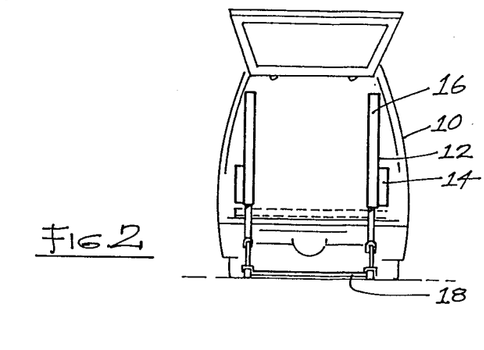
FIG. 2 is an end elevation of the apparatus of FIG. 1.

In FIGS. 1 and 2 there is shown a vehicle 10 having mounted therein a tray loader apparatus 12 in accordance with the present invention.

The tray loader apparatus 12 comprises a pair of spaced horizontal rail means 14 to which are mounted respective vertical post means 16.

The post means 16 have a horizontally disposed tray 18 mounted between them at their lower ends.

The apparatus 12 is arranged to operate reversibly from a first position in which the post means 16 are retracted, the tray 18 is raised and the rail means 14 are retracted so that the whole apparatus 12 is within the vehicle 10, to a second position as shown in FIGS. 1 and 2 in which the rail means 14 are extended, the post means 16 are extended and the tray 18 is lowered.

The construction of the tray loader apparatus 12 is shown in more detail in FIGS. 3 to 6.

Figures 7, 8, 9, 11:
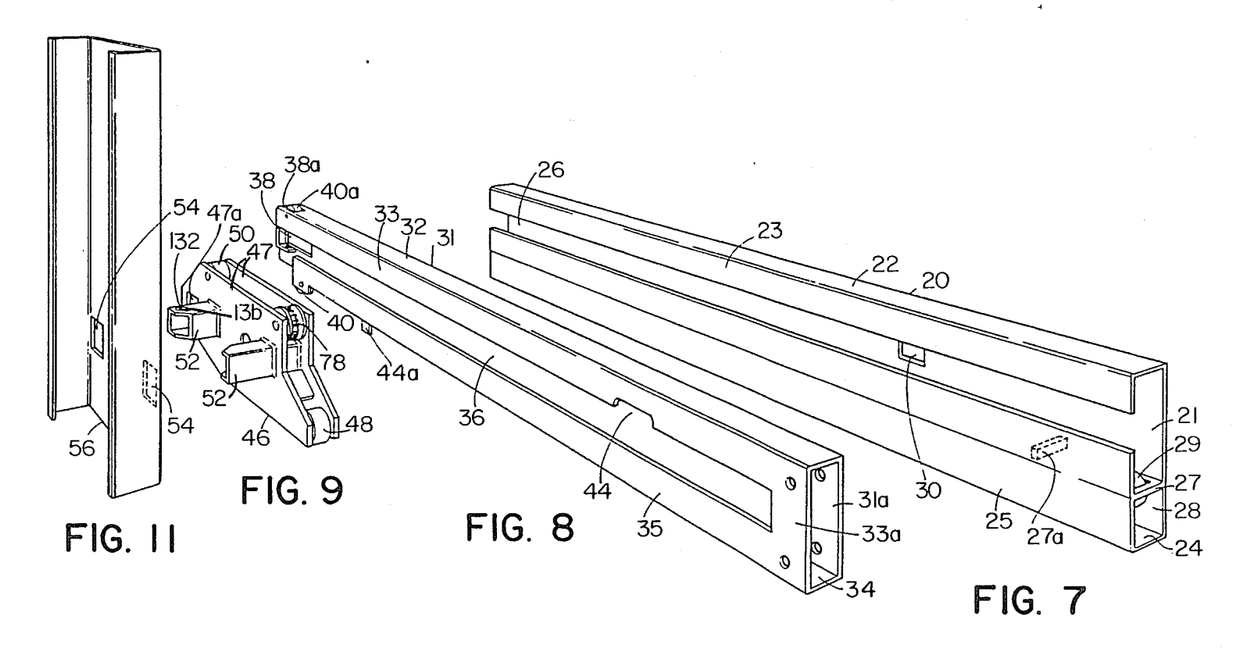
FIG. 7 is a perspective elevation of a first outer rail used in the apparatus of FIGS. 3 to 5.
FIG. 8 is a perspective elevation of a second inner rail used in the apparatus of FIGS. 3 to 5.
FIG. 9 is an upper perspective elevation from a first side of a traveller used in the apparatus of FIGS. 3 to 6.
FIG. 11 is a perspective view of a housing for a post member of the apparatus of FIGS. 3 to 5.

The apparatus 12 comprises a first, outer rail 20 which is arranged to be stationarily, fixedly attached to the body of the vehicle 10 or another fixed structure. The outer rail 20 can be seen in detail in FIG. 7. As can be seen in FIG. 7, the outer rail 20 is of a general C-shape in cross-section. The outer rail 20 comprises a rear wall 21, an upper wall 22 and a depending wall 23 connected to the wall 22. The outer rail 20 also comprises a lower wall 24 and an upstanding wall 25 connected to the wall 24. There is an elongated gap 26 between the walls 23 and 25. A partition 27 extends across the lower part of the C-shape between the rear wall 22 and the wall 25 so as to define a lower chamber 28. A stop 27a is mounted on the partition 27. A roller 29 is mounted in the partition 27 adjacent one end of the rail 20. Further, the rear wall 21 is provided with an aperture 30 at an intermediate location opposite the gap 26.

The apparatus 12 also comprises a second inner rail 31 which is arranged to be slidably mounted in the rail 20 and to be moved relative thereto. The second rail 31 is shown in detail in FIG. 8. As can be seen in FIG. 8, the inner rail 31 is also of a general C-shape in cross-section The inner rail 31 comprises a rear wall 31a, an upper wall 32 and a depending wall 33 connected to the wall 31. The inner rail 31 also comprises a lower wall 34 and upstanding wall 35 connected to the wall 34. There is an elongated gap 36 between the walls 33 and 35. The elongated gap 36 is generally aligned in use, with the gap 26 of the outer rail 20. An upstanding end plate 33a is located in the gap 36 between the walls 33 and 35 and closes off the gap 36.

The inner rail 31 comprises at one end in the rear wall 31 an aperture 38. Also, an aperture 38a is located in the wall 32 and a roller 40a is mounted in the aperture 38a. Further, adjacent the aperture 38, the upstanding wall 35 is provided with a depending portion in which is mounted a roller 40.

The roller 40 is supported on the partition 27 and the roller 40a is supported by the wall 32 and the inner rail 31 is supported by the rollers 40 and 40a at one end and the roller 29 at the other end. The depending wall 33 of the rail 31 also contains a notch 44 at an intermediate location. Further a tab 44a depends from the wall 34 adjacent the roller 40.

Figure 10:
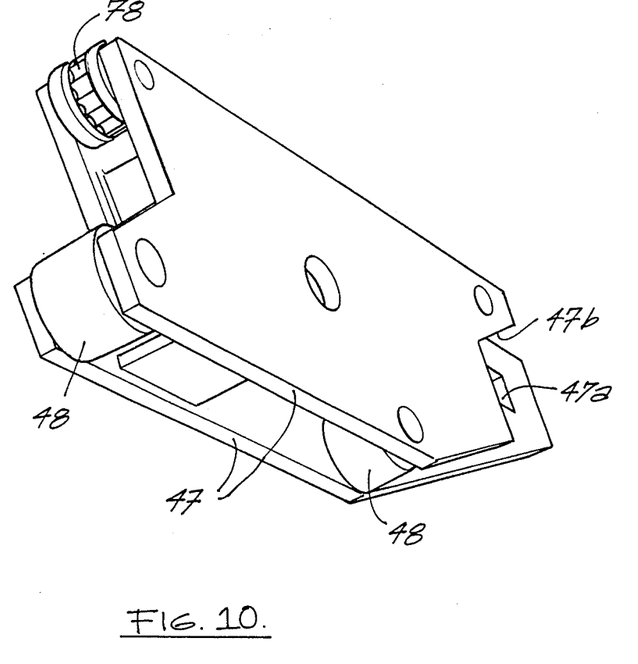
FIG. 10 is a lower perspective view from a second side of the traveller of FIG. 9.

A traveller 46, which is shown in FIGS. 9 and 10, is arranged to be mounted in the inner rail 31. The traveller 46 comprises a pair of spaced parallel plates 47 having mounted between them a pair of lower rollers 48 and an upper roller 50. One of the plates 47 contains an aperture 47a whilst the other plate contains a corresponding cut away as can be seen in FIG. 10. When the traveller 46 is mounted in the inner rail 31, it is rollably supported on the lower wall 34 of the inner rail 32 by the rollers 48 nd rollably contacts the lower side of the upper wall 32 of the inner rail 31 through the roller 50.

As can be seen in FIG. 9, the traveller 46 also has a pair of spaced box section projections 52 projecting outwardly from a side thereof. The projections 52 are arranged to project through the gaps 26 and 36 and to engage with respective, corresponding apertures 54 in a housing member 56 shown in FIG. 11 which is generally channel shaped in cross-section.

Figures 12, 13:
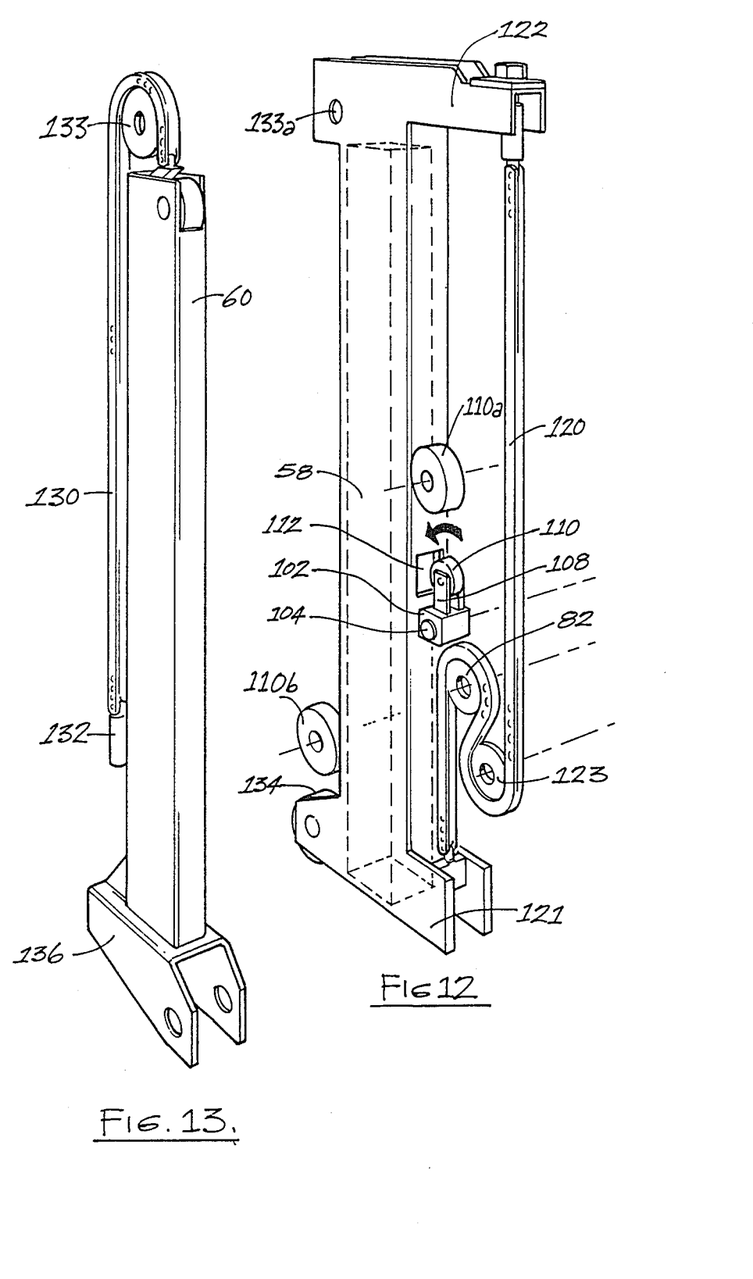
FIG. 12 is a perspective view of a first post member arranged tc be mounted in the housing of FIG. 11.
FIG. 13 is a perspective view of a second post member arranged to be mounted within the post member of FIG. 12.

The housing member 56 in use provides a support for a first post member 58 (shown in FIG. 12) and a second post member 60 (shown in FIG. 13). The post members 58 and 60 will be described in more detail hereinafter. Turning back to FIGS. 3 to 6, it can be seen that the apparatus 12 also comprises a drive sprocket 62 which is connected to a drive means such as a motor (not shown). The apparatus 12 comprises a pair of the drive sprockets 62 each associated with a respective rail means 14.

Further, the drive sprockets 62 are interconnected by a common transverse shaft (not shown) so that they are commonly operated by the drive means and operate synchronously.

A pair of sprockets 64 and 66 are rotatably mounted within the outer rail 20 adjacent the sprocket 62. The sprocket 64 is located below the partition 27 in the chamber 28 while the sprocket 66 is located above the partition 27. A further sprocket 68 is mounted within the outer rail 20 in the chamber 28 at a location remote from the sprocket 66. The sprockets 64, 66 and 68 are all rotatably mounted on suitable axles supported by the walls 21 and 25 of the rail 20.

Further, the sprocket 68 projects upwardly through an aperture 70 in the partition 27.

Figures 3, 4:
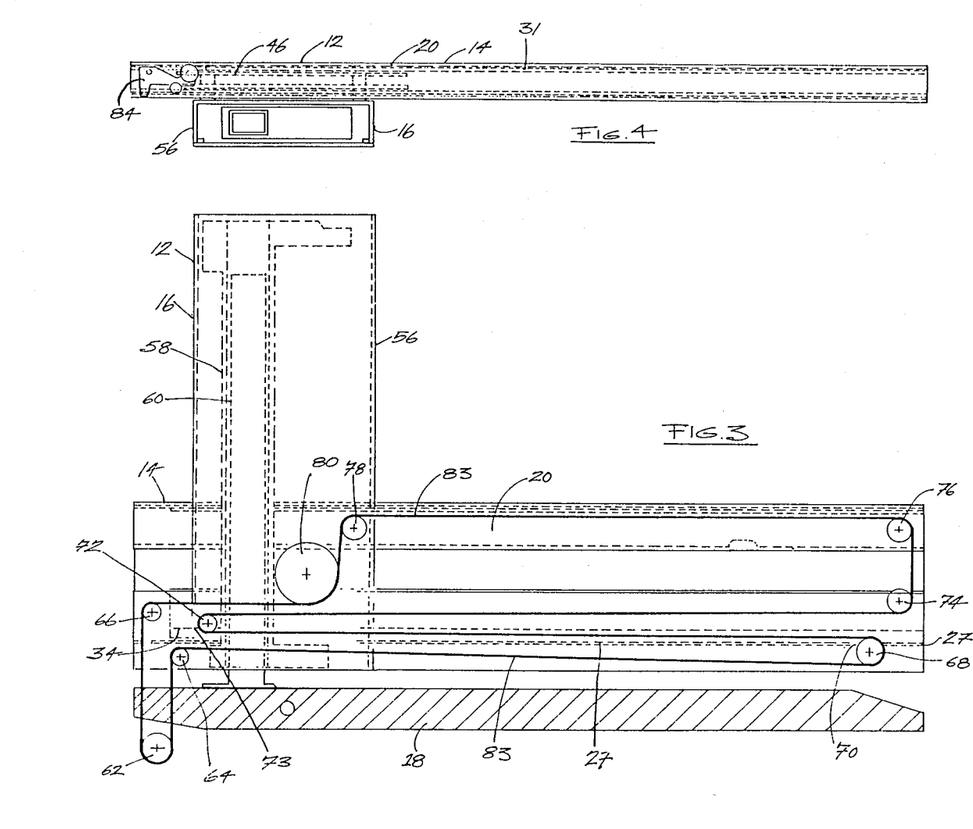
FIG. 3 is a schematic side elevation of one side of a tray loader apparatus in accordance with the present invention in retracted condition.
FIG. 4 is a schematic plan view of the side of the tray loader apparatus shown in FIG. 3.

A sprocket 72 is mounted between the walls 31a and 35 of the inner rail 31 at an end which is adjacent the sprocket 66 in the retracted position of the inner rail 31 shown in FIG. 3. Further, the sprocket 72 is located adjacent an aperture 73 in the wall 34. of the inner rail 31 and sprocket 72 extends downwardly partially through the aperture 73. A further pair of sprockets 74 and 76 are located within the inner rail 31 at the end thereof remote from the sprocket 72. The sprocket 74 is located between the walls 31a and 35 while the sprocket.76 is located between the walls 31a and 33. The sprockets 72, 74 and 76 are all rotatably mounted on suitable axles supported by the facing walls of the rail 31.

A further sprocket 78 is mounted between the plates 47 of the traveller 46. A further large sprocket 80 is located between the plates 47 of the traveller 46. As will be described the sprocket 80 is connected to a further sprocket 82 (see FIG. 12) by means of a common axle as will be described. The common shaft causes the sprockets 80 and 82 to rotate only simultaneously with one another at all times. An endless chain 83 extends over and engages with all of the sprockets 62, 64, 66, 68, 72, 74, 76, 78 and 80. The chain 83 passes from the sprocket 62, through an aperture in the wall 24 and an aperture in the partition 27 to the sprocket 66, then through the inner rail 31 to the sprocket 80, the sprocket 78, then through the upper side of the inner rail 31 to the sprocket 76, then downwardly to the sprocket 74. Subsequently, the chain 83 passes through the lower side of the inner rail 31 to the sprocket 72. The chain 83 passes about the sprocket 72 and then through the aperture 73 to enter the outer rail 20 below the wall 34 of the inner rail 31.

Figure 15:
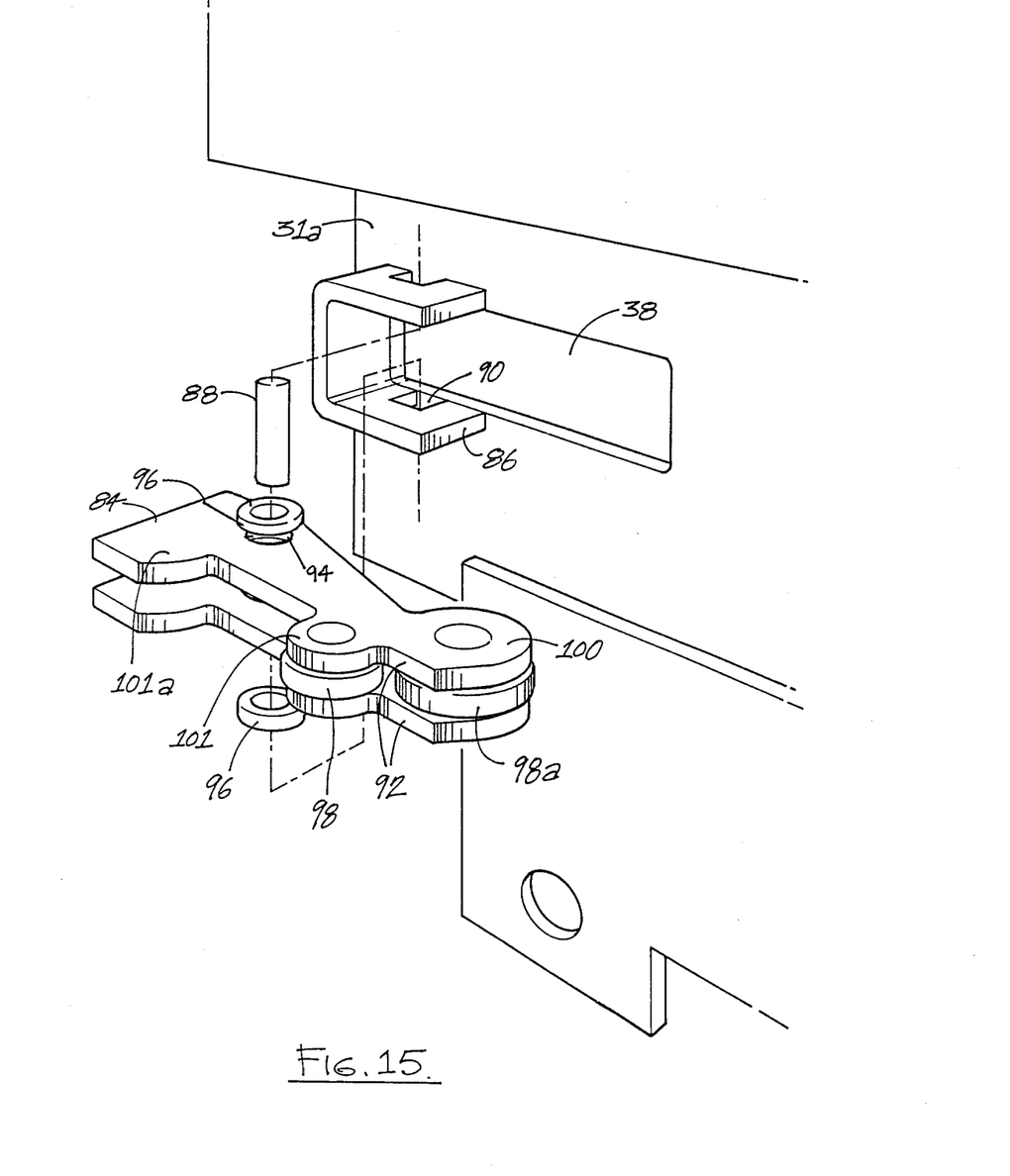
FIG. 15 is a schematic perspective view of a first latch means arranged to latch alternately the second rail to the traveller and upon releasing the traveller to latch the first and second rails together in use.

The chain 83 then extends to the sprocket 68. The chain 68 passes about the sprocket 83 through the aperture 70 to enter the chamber 28. Then the chain 83 passes to the sprocket 64 and thence through an aperture in the wall 24 to the sprocket 62. Further, a latch means 84 shown in FIG. 15, is mounted on a U-shaped plate 86 of the rail 31 adjacent the aperture 38. The latch means 84 comprises a pin 88 which is mounted in a pair of opposed apertures 90 of the plate 86. The latch means 84 further comprises a pair of spaced parallel plates 92 containing aligned apertures 94. The pin 88 is located within the apertures 94 to provide a pivot axis for the plates 92.

Further, washers 96 are mounted about the pin 88 between the plates 92 and the U-shaped plate 86. The plates 92 are spaced apart by rollers 98 and 98a as can be seen in FIG. 15. The roller 98a is mounted in a lateral projection 100 of the plates 92 at an end thereof remote from the pin 88.

Spring means (not shown) is provided for urging the plates 92 toward the apertue 38 so that the projection 100 enters the aperture 38 and the roller 98a is normally in engagement with the rear wall 21 of the rail 20. Also the roller 98 is contained in an intermediate projection 101 which faces away from the projection 100 and is arranged to engage with the aperture 47a of the traveller 46. The latch 84 also contains a projection 101a in the plates 92.

Figure 16:
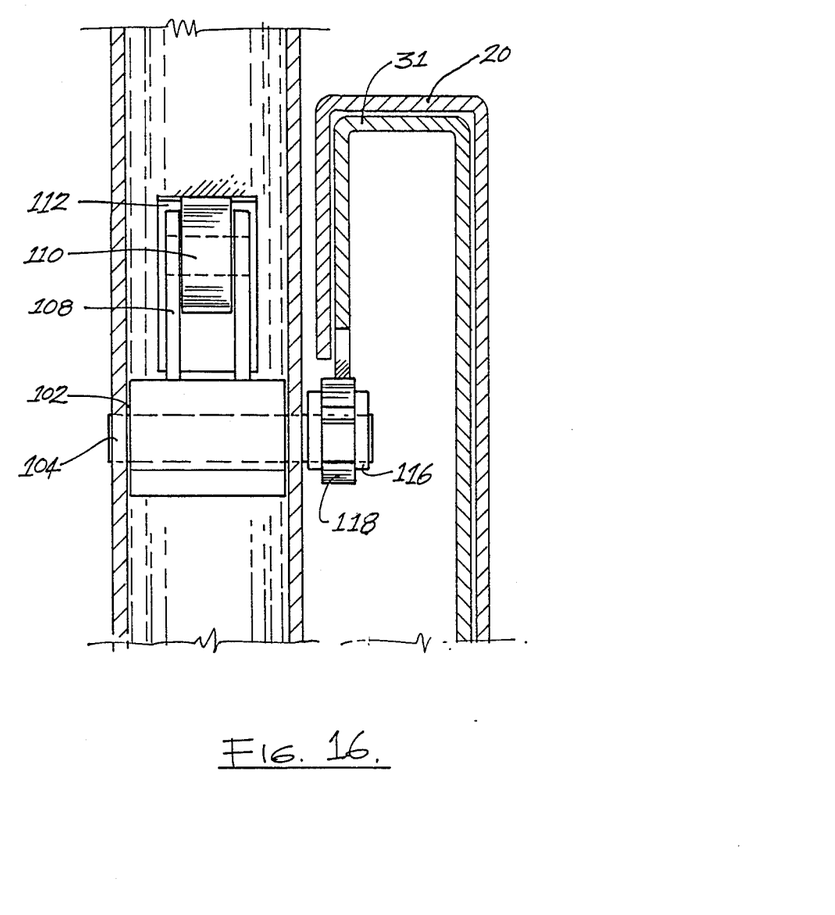
FIG. 16 is an end elevation of a second latch means viewed from the direction of the arrows of FIG. 16 arranged to latch alternately the first post in a raised position and upon releasing the first post to latch the traveller to the second rail.

The engagement with the traveller 46 also tends to keep the plates 92 in engagement with the aperture 38. A further latch means 102 is shown in FIGS. 16 to 18.

The latch means 102 is mounted to the post 58 as shown in FIG. 12 and comprises a spindle 104 which provides a pivot axis. A first block 106 is fixedly mounted to the spindle 104. A pair of spaced parallel plates 108 are mounted to the block 106 and constitute a first arm of the latch means 102. A roller 110 is supported on a spindle at the end of the plates 108 remote from the block 106. The roller 110 is arranged to engage releasably with an aperture 112 in the post 58. As can be seen in FIG. 17, the roller 110 engages with the edge of the aperture 112 in an undercentre position so that the roller 110 is always tending to be pushed outwardly by the weight of the post 58.

A second block 114 is also fixedly mounted to the spindle 104. A pair of spaced parallel plates 116 are mounted to the block 114 and constitute a second arm of the latch means 102. A roller 118 is supported on a spindle at the end of the plates 116 remote from the block 114.

Figure 17:
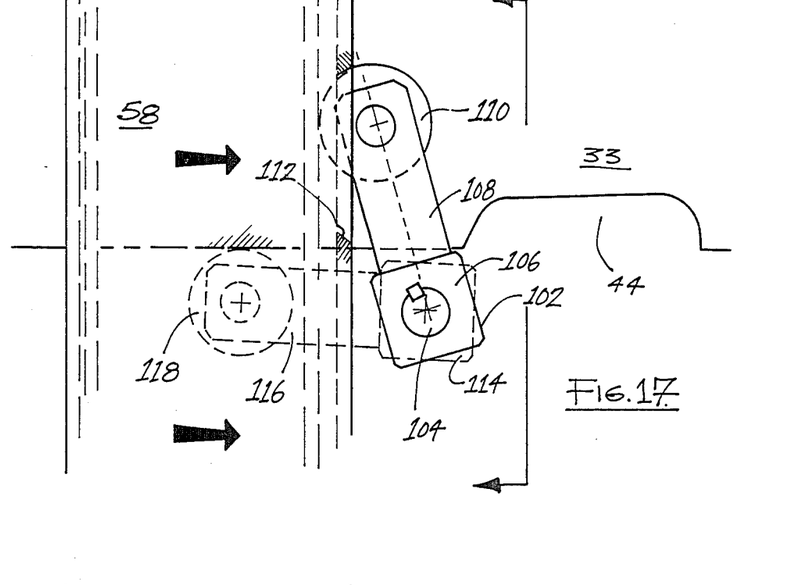
FIG. 17 is a side elevation of the latch means of FIG. 16 in a first position.
Figure 18:
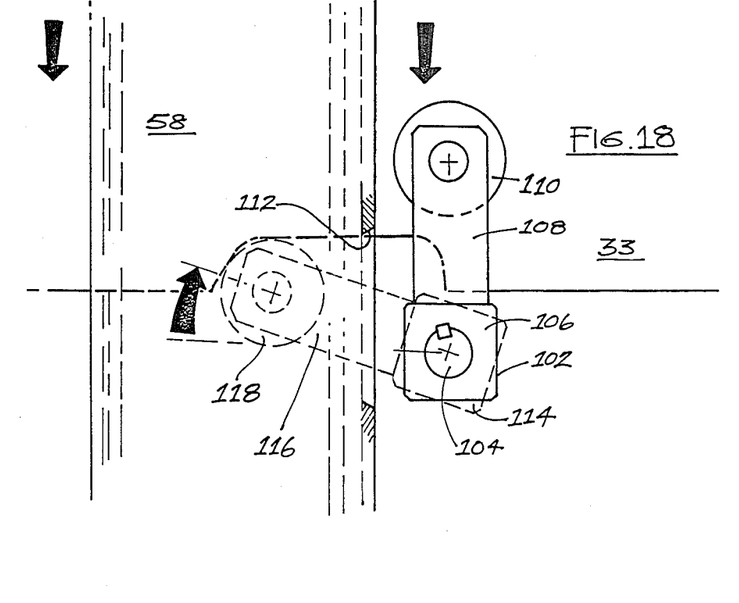
FIG. 18 is a side elevation similar to FIG. 17 showing the latch means of FIG. 16 in a second position.

The roller 118 is arranged to engage the underside of the wall 33 of the rail 31 as can be seen in FIGS. 17 and 18.

The arms constituted by the plates 108 and 116 are disposed at a fixed angle to one another.

In use, the apparatus shown in FIG. 3, is caused to operate by rotation of the sprocket 62 by the drive means.

The sprocket 62 is caused to rotate in a clockwise direction (as seen in FIG. 3). This causes the chain 83 to travel over the sprocket 62. A corresponding rotation of the sprockets 64, 66 and 68 is established by rotation of the sprocket 62 as the sprockets 64, 66 and 68 are all mounted on the rail 20 which is held stationary by being mounted to a fixed structure. However, the sprockets 72, 74 and 76 are mounted on the inner rail 31. The tension imparted to the chain 83 causes the rail 31 to extend outwardly of the rail 20 on the rollers 40 and 29. Whilst the rail 31 is moving relative to the rail 20 the sprockets 72, 74 and 76 do not rotate and the chain 83 is simply maintained in tension.

Figure 5:
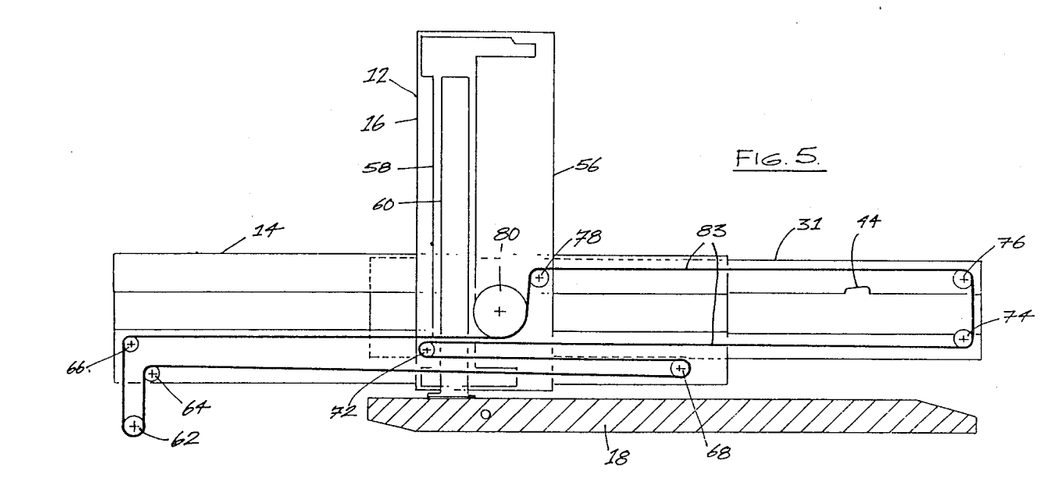
FIG. 5 is a view similar to FIG. 3, with the tray loader apparatus in a partially extended condition.
Figure 6:
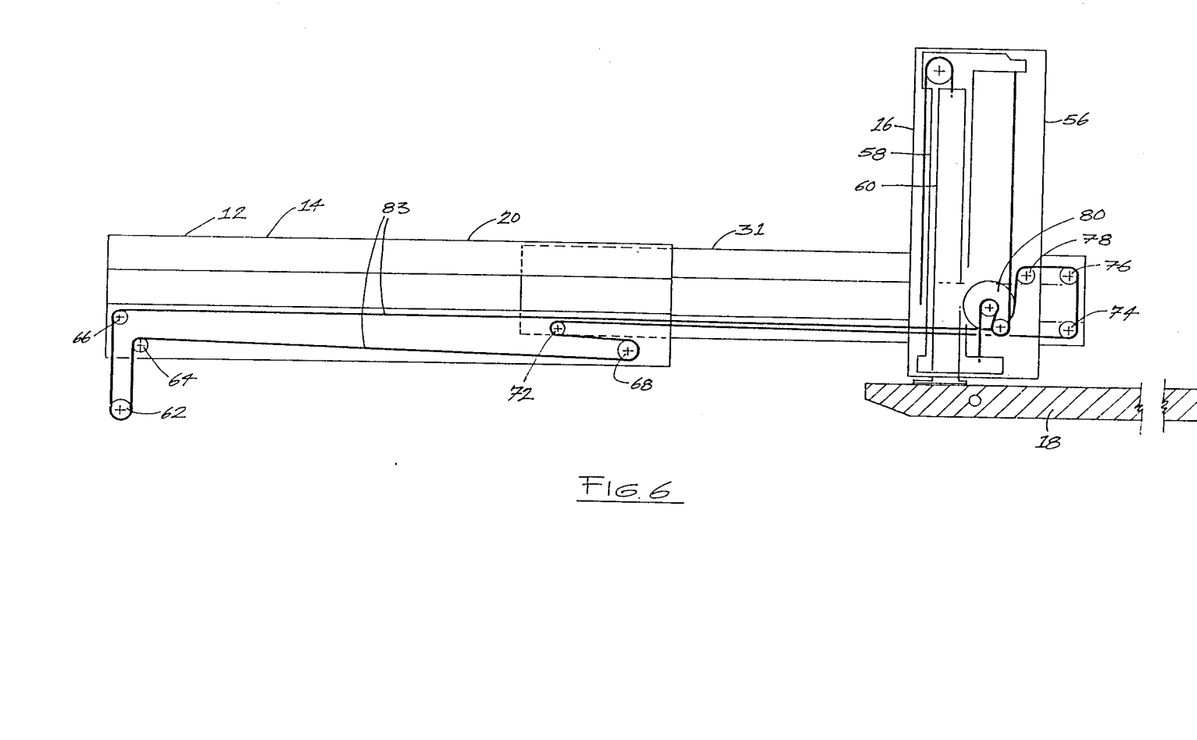
FIG. 6 is a view similar to FIG. 3, with the tray loader apparatus in a fully extended condition.

Thus, in the intermediate position shown in FIG. 5, the sprockets 72, 74 and 76 have all moved to the right from the position shown in FIG. 3 whilst the sprockets 64, 66 and 68 have remained stationary. As the rail 31 moves relative to the rail 20 the projection 100 of the latch 84 is spring urged into engagement with the aperture 38 such that the roller 98a is in rolling engagement with the rear wall 21 of the rail 20.

The movement of the rail 31 continues until the roller tab 44a strikes the stop 27a. At this point the roller 98a and projection 100 are urged into engagement with the aperture 30. Simultaneously, the roller 98 of the latch 84 is withdrawn from the aperture 47a of the traveller 46. This effectively latches the rails 20 and 31 together and prevents any further relative movement of these components whilst simultaneously unlatching the traveller 46 from the rail 31 and allowing the traveller 46 to move relative to the rail 31.

At this point the sprockets 72, 74 and 76 commence to rotate and drive is transmitted to the traveller 46 within the inner rail 31 via the sprockets 78 and 80 which do not rotate.

The traveller 46 moves relative to the rails 20 and 31 to the right as seen in FIG. 3 on the rollers 48 and 50. Whilst the traveller 46 is moving relative to the rails 20 and 31 the sprockets 78 and 80 do not rotate and the chain 83 is simply maintained in tension. Further, the roller 118 of the latch 102 bears against the underside of the wall 33 of the rail 20 while the weight of the post 58 bears down on the roller 110. However, at a certain point in movement of the traveller 46, the roller 118 engages the aperture 44 in the rail 20. This enables the weight of the post 58 to act downwardly on the roller 110. As can be seen in FIGS. 17 and 18 the upper and lower edges of the aperture 112 are cut at an angle such that the edges of the aperture 112 taper inwardly of the wall of the post 58. The rail 31 continues moving until it reaches a position where the rearward end of the notch 44 is in engagement with the roller 118 as shown in FIG. 18. Thus, engagement with the aperture 44 causes the roller 110 to be pivoted outwardly of the post 58 by the weight of the post 58 acting downwardly, to the position shown in FIG. 18.

Further, at this point the leading projection 52 of the traveller 46 engages with the plate 33a in the rail 31 to prevent further movement of the traveller relative to the rail 31. Thus, the sprockets 78 and 80 are then caused to rotate by the chain 83.

Rotation of the sprocket 80 causes similtaneous rotation of the sprocket 82 which is mounted on a common shaft as described above.

The sprocket 82 is operatively connected to a chain 120 shown in FIG. 12. The chain 120 has a first end mounted to a bracket 121 at a lower end of the post 58 and a second end mounted to a bracket 122 at an upper end of the post 58

Further, in addition to the sprocket 82, the chain 120 passes over an idler sprocket 123.

Once the roller 110 has been disengaged from the aperture 112, the post 58 can drop under the influence of gravity.

Figure 14:
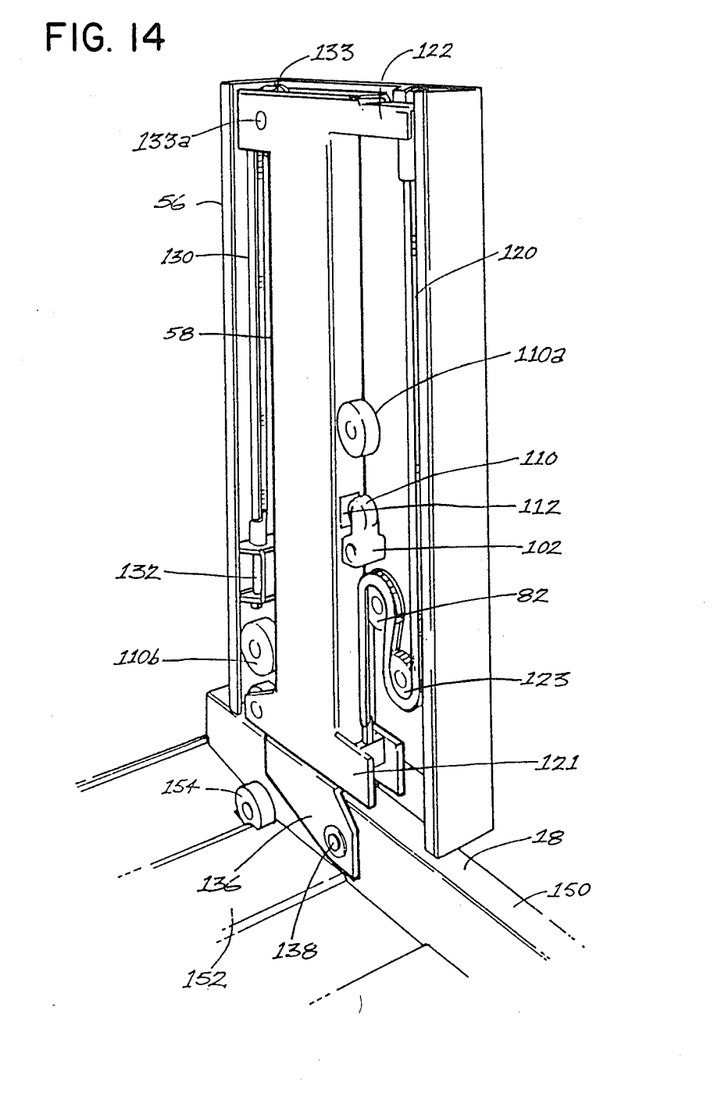
FIG. 14 is a schematic, perspective view of a post means 16 in assembled condition.

Further, the chain 120 is caused to pass over the sprockets 82 and 123 by the rotation thereof caused by the sprocket 80. Thus, the post 58 descends in a controlled manner from the housing 56. As shown in FIGS. 12 and 14 the housing 56 also contains guide rollers 110a and 110b for the post 58. These rollers 110a and 110b are mounted in the housing for rotation and rollably contact the post 58.

The roller 110 also rollably contacts the outer face of the post 58 as the latter descends as shown in FIG. 18. Also, the post 60 which is mounted within the post 58 is also caused to descend. This is because the post 60 is suspended from a chain 130 which has one end anchored to an aperture 13b (see FIG. 9) in a projection 52 of the traveller 46 by means of a pin 132 and the other end attached to an upper end of the post 60. The chain 130 also passes over: an idler sprocket 133 located in the upper end of the post 60 by means of an axle located in a pair of opposed. apertures 133a (one of which can be seen in FIG. 12). As the post 58 descends the post 60 also descends within the post 58 such that the post 60 descends more rapidly and contacts the ground prior to the post 58 reaching the lower end of its travel.

The lower end of the post 60 is provided with a bracket 136. The bracket 136 contains a spindle 138 to which the tray 18 is pivotally connected. The pivotal connection means that as the tray 18 approaches the ground it can simply pivot upwardly if it encounters any obstruction.

Downward movement of the post 58 is not affected by contact of the tray 18 with the ground, but simply continues until the bracket 122 contacts the roller 110a.

When it is desired to raise the tray 18 from ground level, the sprocket 62 is simply caused to rotate in the anti-clockwise direction as seen in FIG. 3. This causes the chain 83 to travel in the same direction and the sprockets 64, 66, 68, 72, 74, 76, 78 and 80 to be rotated as seen in FIG. 3. This causes the sprocket 82 to be rotated in the same direction as the sprocket 80. Thus, the chain 120 passes over the sprockets 82 and 123 and lifts the post 58 which causes lifting of the post 60 at a more rapid rate.

Thus, the tray 18 is lifted along with the posts 58 and 60 until the post 60 is fully retracted in the post 58.

The roller 110b also acts as a stop by contacting a roller 134 which is mounted to the post 58 and is arranged to engage with the housing 56 to provide additional guidance for the post 58. This action causes upward movement of the post 58 to be arrested and retractive movement of the traveller 46 to be commenced by cessation of rotation of the sprockets 78 and 80 and 82.

As shown in FIG. 18, the roller 118 is located in the notch 44 in an undercentre manner and the adjacent edge of the notch 44 is sloped. Thus, once the roller 110 is opposite the aperture 112 and upward motion of the post 60 is arrested. The roller 118 is pushed out of the aperture 44 along the sloped left hand side thereof as seen in FIGS. 17 and 18. In this way, the post 58 is latched in its uppermost position while the traveller 46 commences travel to the left as seen in FIG. 3.

This movement of the traveller 46 is continued until it is stopped by engagement with the projection 101a of the latch 84. This action causes the projection 101 to engage with the aperture 47a of the traveller 46 and to latch the traveller 46 to the rail 31 and simultaneously to disengage the projection 101 from the aperture 30. This enables the rail 31 to move relative to the rail 20. It should be noted that the latch 84 is an overcentre latch when latching the rails 20 and 31 together and a positive action as described is required to disengage it from the aperture 30.

This cessation of movement of the traveller 46 causes the sprockets 72, 74 and 76 to cease rotation and the rail 31 to commence retractive movement caused by rotation of the sprockets 64, 66 and 68. The retractive movement of the rail 31 continues until an end 31a (see FIG. 15) of the inner rail 31 contacts a spacer mounted on the axle of the sprocket 66.

In all phases of operation of the apparatus 12 the tray 18 remains substantially horizontal unless, as mentioned above, the tray 18 contacts an obstruction which causes it to pivot on its mountings to the posts 60.

As can be seen in FIG. 14, the tray 18 conveniently comprises a box section member 150 on either side of the tray 18. Each box section member 150 fits in a respective bracket 136 and is pivotally secured by the pin 138. Further, a corrugated plate 152 is mounted between the members 150. A wheel 154 is mounted to each member 150. Each wheel 154 projects through an aperture in the plate 154 to act as a ground engaging member when the tray 18 is lowered.

Modifications and variations such as would be apparent to a skilled addressee are deemed within the scope of the present invention. For example, the single flexible drive means in the form of the chain 83 and its associated sprockets could be replaced by any equivalent means such as an endless toothed belt arranged to engage with rollers containing recesses of complementary shape to the teeth of the belt. For example, the posts 60 may be omitted and the tray 18 may be attached to an elongated post 58 although the telescoping arrangement of the posts 58 and 60 does enable a substantial degree of drop to be obtained in an environment with a low headroom.

Further, more than one post 58 may be used on each side for a multiple point lift. Also, the rails 20 and 31 need not be nested as shown in the drawings but simply associated with one another.

I claim:

1. A tray loader apparatus which comprises rail means having a first rail arranged to be stationarily fixed to a supporting structure, and a second rail slidably associated with the first rail and arranged to move relative to the first rail in a horizontal direction, a post associated with the second rail and having a lower end, a load supporting tray mounted at the lower end of the post and arranged to be horizontally disposed, in use, and the lower end of the post being arranged to be raised and lowered together with the tray relative to the rail means, the apparatus further comprising means for causing the secone rail to move relative to the first rail so as to extend the rail means in a horizontal direction and then causing the lower end of the post and the tray to be lowered from an initial position, and for causing the lower end of the post and the tray to be raised from a lowered position to its initial position and then for the second rail to move relative to the first rail so as to retract the rail means, a traveller associated with the second rail, the post being attached to the traveller, the traveller being arranged to move reversibly relative to the second rail away from and towards the first rail and the post arranged to be lowered when the traveller reaches a predetermined point on the second rail, and latch means being provided for releasing the post when the traveller reaches the predetermined point on the second rail to enable the post to be lowered and for simultaneously latching the traveller to the second rail.

2. A tray loader apparatus according to claim 1, wherein latch means is provided for latching the first and second rails together when the rail means has extended to a predetermined extent.

3. A tray loader apparatus according to claim 2, wherein the traveller is arranged to move relative to the second rail only when the first and second rails are latched together.

4. A tray loader apparatus according to claim 1, wherein the post comprises a first, upper post member and a second lower post member, the tray being connected to the second post member, and the first post member being arranged to be lowered at a first rate of descent while the second post member is arranged to be lowered at a second rate of descent which is greater than the first rate.

5. A tray loader apparatus according to claim 1, wherein the second rail is located within the first rail in the retracted condition of the rail means.

6. A tray loader apparatus according to claim 5, wherein the rails are each of C-Section and each has an elongated gap, said gaps being substantially aligned with one another.

7. A tray loader apparatus according to claim 1 wherein the tray is pivotally connected to the post so that the tray can pivot upwardly in the event that it encounters any obstruction.

8. A tray loader apparatus according to claim 1, further comprising a flexible drive transmission means arranged to be driven by a drive means and being operatively connected to a plurality of rotatable members mounted on the first and second rails and the traveller.

9. A tray loader apparatus which comprises rail means having a first rail arranged to be stationarily fixed to a supporting structure, and a second rail slidably associated with the first rail and arranged to move relative to the first rail in a horizontal direction, a post associated with the second rail and having a lower end, a load supporting tray mounted at the lower end of the post and arranged to be horizontally disposed, in use, and the lower end of the post being arranged to be raised and lowered together with the tray relative to the rail means, and the apparatus further comprising means for causing the second rail to move relative to the first rail so as to extend the rail means in a horizontal direction and then causing the lower end of the post and the tray to be lowered from an initial position, and for causing the lower end of the post and the tray to be raised from a lowered position to its initial position and then for the second rail to move relative to the first rail so as to retract the rail means, a traveller associated with the second rail, the post being attached to the traveller, the traveller being arranged to move reversibly relative to the second rail away from and towards the first rail, the second rail located within the first rail in the retracted condition of the rail means, the rails each being of C-section ad each having an elongated gap, said gaps being substantially aligned with one another, and the traveller being supported by the second rail and being connected to the post by projections extending through the gaps of the C-sections.

10. A tray loader apparatus comprising a first rail arranged to be stationarily fixed to supporting structure, and a second rail slidably associated with the first rail and arranged to move relative to the first rail in a horizontal direction; a post associated with the second rail and having a lower end; a load supporting tray mounted at the lower end of the post and arranged to be horizontally disposed, in use, and the lower end of the post being arranged to be raised and lowered together with the tray relative to the first and second rails; and the apparatus further comprising means for causing the second rail to move relative to the first rail so as to extend the second rail in a horizontal direction and then causing the lower end of the post and the tray to be lowered from an initial position, and for causing the lower end of the post and the tray to be raised from the lowered position to its inital position and then for the second rail to move relative to the first rail so as to retract the second rail, a traveller being associated with the second rail, the post being attached to the traveller, and the traveller being arranged to move reversibly relative to the second rail away from and towards the first rail, and said means including a drive means, a flexible drive transmission means arranged to be driven by the drive means and being operatively connected to a plurality of rotatable members mounted on the first and second rails and the traveller, one of the rotatable members is operatively connected to a mechanism for raising and lowering the post, such that drive from the drive means is transmitted automatically to the first and second rails and the traveller and then to the post and vice versa.

11. A tray loader apparatus according to claim 10, wherein latch means is provided for alternatively latching the second rail and traveller together and then relasing the traveller and latching the first and second rails together when the rail means has extended to a predetermined extent and performing a reverse operation when the rail means is retracted.

12. A tray loader apparatus according to claim 11, wherein the traveller is arranged to move relative to the second rail only when the first and second rails are latched together.

13. A tray looder apparatus according to claim 10 wherein in the post is arranged to be lowered when the traveller reached a predetermined point on the second rail.

14. A tray loader apparatus according to claim 13, wherein latch means is provided for releasing the post when the traveller reaches a predetermined point on the second rail to enable the post to be lowered and for simultaneously latching the traveller to the second rail and performing a reverse operation when the post is raised.

15. A tray loader apparatus according to claim 10, wherein the post comprises a first, upper post member and a second lower post member, the tray being connected to the second post member, and the first post member being arranged to be lowered at a first rate of descent while the second post is arranged to be lowered at a second rate of descent which is greater than the first rate.

16. A tray loader apparatus according to claim 10, wherein the second rail is located within the first rail in the retracted condition of the rail means.

17. A tray loader apparatus according to claim 16, wherein the rails are each of C-section and each has an elongated gap, said gaps being substantially aligned with one another.

18. A tray loader apparatus according to claim 16, characterized in that the rails are each of C-section and each has an elongated gap, said gaps being substantially aligned with one another, and said traveller is supported by the second rail and is connected to the post by projections extending through the gaps of the C-sections.

19. A tray loader apparatus according to claim 10, wherein the tray is pivotally connected to the post so that the tray can pivot upwardly in the event that is encounters any obstruction.

* * * * *